United States Patent
Bi et al.

(10) Patent No.: US 10,897,218 B1
(45) Date of Patent: Jan. 19, 2021

(54) CONTROL SYSTEM AND METHOD FOR PERMANENT MAGNET SYNCHRONOUS TRACTION AND TRANSMISSION SYSTEM

(71) Applicant: CRRC QINGDAO SIFANG ROLLING STOCK RESEARCH INSTITUTE CO., LTD., Qingdao (CN)

(72) Inventors: Jingbin Bi, Qingdao (CN); Meng Xia, Qingdao (CN); Hu Cao, Qingdao (CN); Fanfei Zeng, Qingdao (CN)

(73) Assignee: CRRC QINGDAO SIFANG ROLLING STOCK RESEARCH INSTITUTE CO., LTD. (CN), Qingdao (CN)

( * ) Notice: Subject to any disclaimer, the term of this patent is extended or adjusted under 35 U.S.C. 154(b) by 0 days.

(21) Appl. No.: 17/027,596

(22) Filed: Sep. 21, 2020

Related U.S. Application Data (63) Continuation of application No. PCT/CN2018/115118, filed on Nov. 13, 2018.

(30) Foreign Application Priority Data

May 30, 2018 (CN) .......................... 2018 1 0537327

(51) Int. Cl.
*H02P 21/00* (2016.01)
*H02P 25/024* (2016.01)
(Continued)

(52) U.S. Cl.
CPC ............ *H02P 25/024* (2016.02); *H02P 21/22* (2016.02); *H02P 27/12* (2013.01); *H02P 27/14* (2013.01); *H02P 2207/05* (2013.01)

(58) Field of Classification Search
CPC ........ H02P 25/024; H02P 21/22; H02P 27/12; H02P 27/14; H02P 2207/05
(Continued)

(56) References Cited

U.S. PATENT DOCUMENTS

| 6,008,618 A | 12/1999 | Bose |
| 2008/0136380 A1* | 6/2008 | Hoffmann ............... H02P 21/30 322/29 |

(Continued)

FOREIGN PATENT DOCUMENTS

| CN | 101529714 A | 9/2009 |
| CN | 102694498 A | 9/2012 |

(Continued)

OTHER PUBLICATIONS

Search Report of the priority CN application.
International Search Report.

*Primary Examiner* — Eduardo Colon Santana
*Assistant Examiner* — Gabriel Agared
(74) *Attorney, Agent, or Firm* — J.C. Patents (57) ABSTRACT

The present application provides a control system and method for a permanent magnet synchronous traction and transmission system. A The control system comprises a sampling unit and a controller; the sampling unit collecting an operation excitation current and an operation torque current, a input capacitor voltage and a rotor frequency; the controller acquires a target torque instruction issued to the traction and transmission system, calculates a target excitation current value and a target torque current value, and generates an excitation current regulation value and a torque current regulation value; a regulation unit is configured to generate a torque current regulation value according to the target torque current value and an operation torque current value and generate a target modulation ratio and a modulation frequency according to the excitation current regulation value and the torque current regulation value output from the regulation unit and finally output a PWM modulation wave control signal.

9 Claims, 4 Drawing Sheets

(51) Int. Cl.
*H02P 27/14* (2006.01)
*H02P 27/12* (2006.01)
*H02P 21/22* (2016.01)

(58) Field of Classification Search
USPC .................................................. 318/400.02
See application file for complete search history.

(56) References Cited

U.S. PATENT DOCUMENTS

2009/0065273 A1* 3/2009 Wyatt ............... B60W 30/1886
  180/65.8
2011/0043149 A1* 2/2011 Kitanaka ................. H02P 21/06
  318/400.26
2011/0062908 A1* 3/2011 Kitanaka ................. H02P 21/22
  318/400.22
2017/0170763 A1* 6/2017 Blackwelder ............. H02P 5/74

FOREIGN PATENT DOCUMENTS

| CN | 202424614 U | 9/2012 |
| CN | 103532461 A | 1/2014 |
| CN | 105634355 A | 6/2016 |
| CN | 107592047 A | 1/2018 |
| CN | 108736787 A | 11/2018 |

\* cited by examiner

CONTROL SYSTEM AND METHOD FOR PERMANENT MAGNET SYNCHRONOUS TRACTION AND TRANSMISSION SYSTEM

CROSS-REFERENCE TO RELATED APPLICATIONS

This application is a continuation of PCT/CN2018/115118 filed on Nov. 13, 2018, which claims the priority benefit of Chinese patent application No. 201810537327.0 filed on May 30, 2018. The entirety of the above-mentioned patent applications is hereby incorporated by reference herein and made a part of this specification.

TECHNICAL FIELD

The present application relates to the field of traction and transmission control, and particularly to a control system and a control method suitable for a permanent magnet synchronous traction and transmission system.

BACKGROUND ART

The traction and transmission system is a power system of a train, and mainly composed of a converter and a motor. The motor completes a conversion from electrical energy to mechanical energy and drives the train to operate.

The permanent magnet synchronous traction and transmission system adopts a permanent magnet synchronous motor. Compared with an asynchronous motor, the permanent magnet synchronous motor has the characteristics of high power factor, low heat generation, low noise and high reliability. The application of the urban-rail permanent magnet synchronous motor in the rail traffic traction and transmission system is at an initial stage. The control of the permanent magnet synchronous traction and transmission system has many technical problems which need to be further researched. Although there are similarities between the control of the traction motor and the traction converter and the control of the asynchronous traction and transmission system, the permanent magnet synchronous motor also has many practical problems unique thereto.

At present, the existing urban-rail permanent magnet synchronous motor control algorithms mostly adopt the asynchronous Space Vector Pulse Width Modulation (SVPWM) for operation. Under a condition of a high rotation speed, in order to meet the harmonic requirement of the output current, the switching frequency of the Insulated Gate Bipolar Transistor (IGBT) is greatly increased, the output loss rises, and the hardware cost is also increased to meet the heat dissipation requirement.

Because the permanent magnet synchronous motor is excited by a permanent magnet, the flux-weakening range is narrow and the flux-weakening is difficult. A better flux-weakening control technology can greatly improve the system performance without changing a capacity of inverter. At present, many flux-weakening schemes have complex algorithms, while the flux-weakening efficiencies are low and the effects are poor.

SUMMARY

In view of the problems of complex algorithms and low control precision existing in the control of the permanent magnet synchronous motor in the prior art, the present application proposes a novel control system and method for a permanent magnet synchronous traction and transmission system. The specific technical solutions are as follows:

A control system for a permanent magnet synchronous traction and transmission system, for controlling the permanent magnet synchronous traction and transmission system, the control system comprising a sampling unit and a controller;

the sampling unit is connected to a permanent magnet synchronous motor, and comprises: a current sensor for collecting an operation excitation current and an operation torque current of the permanent magnet synchronous motor, a voltage sensor for collecting a input capacitor voltage of the permanent magnet synchronous motor, and a resolver for collecting an initial rotor position and a rotor frequency of the permanent magnet synchronous motor;

the controller comprises:

an instruction acquisition unit, configured to acquire a target torque instruction issued to the traction and transmission system;

a Maximum Torque Per Ampere (MTPA) calculation unit, configured to calculate a target excitation current value and a target torque current value according to the target torque instruction;

a regulation unit, comprising: an excitation regulation unit and a torque regulation unit; the excitation regulation unit configured to generate an excitation current regulation value according to the target excitation current value and an operation excitation current value; and the torque regulation unit configured to generate a torque current regulation value according to the target torque current value and an operation torque current value;

a decoupling control unit, configured to generate a target modulation ratio and a modulation frequency according to the excitation current regulation value and the torque current regulation value output from the regulation unit; and a segment synchronous modulation unit, configured to output a PWM modulation wave control signal for the permanent magnet synchronous motor, according to the target modulation ratio and the modulation frequency generated by the decoupling control unit.

Preferably, the controller further comprises a flux-weakening compensation unit configured to generate compensation signals for the target excitation current value and the target torque current value to compensate for both.

Preferably, the controller further comprises an current accurate calculation unit configured to convert the target excitation current value and the target torque current value into an accurate excitation current value and an accurate torque current value; the excitation regulation unit generates the excitation current regulation value by regulation according to the accurate excitation current value, and the torque regulation unit generates the torque current regulation value by regulation according to the accurate torque current value.

Preferably, the controller further comprises a voltage feedforward unit configured to acquire output data of the current accurate calculation unit and generates a compensation data for target torque.

The present application further provides a control method for a permanent magnet synchronous traction and transmission system, comprising following steps of:

converting a target torque instruction of a traction and transmission system converted into a target excitation current value and a target torque current value;

regulating and calculating the target excitation current value and the target torque current value;

decoupling the target excitation current value and the target torque current value, generating a target modulation ratio according to the target excitation current value, and generating a modulation frequency according to the target torque current value; and using the target modulation ratio and the modulation frequency to control a permanent magnet synchronous traction motor.

Preferably, a method for converting the target torque instruction of the traction and transmission system into the target excitation current value and the target torque current value of the permanent magnet synchronous motor is as follows:

according to:

$$T_e = \frac{3}{2}P_n \vec{\psi}_f \times \vec{i}_s = \frac{3}{2}P_n\left[\psi_f i_s \sin\phi + \frac{1}{2}(L_q - L_d)i_s^2 \sin 2\phi\right] = \frac{3}{2}P_n\left[\psi_f i_q + \frac{1}{2}(L_q - L_d)i_d i_q\right] \quad (1)$$

$$i_d = \frac{\psi_f}{2(L_q - L_d)} \pm \sqrt{\frac{\psi_f^2}{4(L_q - L_d)^2} + i_q^2} \quad (2)$$

the above two equations are combined to calculate the target excitation current value and the target torque current value;

wherein $T_e$ is a target torque, $L_q$ is an equivalent inductance of a shaft q, $L_d$ is an equivalent inductance of a shaft d, $i_q$ is the target torque current value, $i_d$ is the target excitation current value, $i_s$ is a target phase current, $\psi_f$ is a motor flux linkage, $P_n$ is a number of pole pairs of the motor, and $\phi$ is a voltage-current angle difference of the motor.

Preferably, the method further comprises a step of: converting a converted input capacitor voltage according to a set target modulation ratio; after a comparison with a input capacitor voltage acquired by sampling, generating a torque current compensation amount $i_{q\_crr}$ and an excitation current compensation amount $i_{d\_crr}$ by regulation, and synthesizing the torque current compensation amount and the excitation current compensation amount with the target torque current value and the target excitation current value, respectively, for a subsequent calculation.

Preferably, the method further comprises a step of: performing an accurate calculation for the target excitation current value and the target torque current value to obtain an accurate excitation current value $i_{dtarget}$ and an accurate torque current value $i_{qtarget}$ of the motor:

$$i_{dtarget} = \frac{\psi_f + \sqrt{\psi_f^2 + 4\left(L_q - L_d - \frac{\partial L_q}{\partial L_d}\right)i_{qtarget}^2}}{2\left(L_q - L_d - \frac{\partial L_q}{\partial L_d}i_{qtarget}\right)} \quad 3)$$

$$i_{dtarget} = i_d + i_{d\_ccr} \quad 4$$

using the obtained accurate excitation current value $i_{dtarget}$ and accurate torque current value $i_{qtarget}$ for the regulating and calculating.

Preferably, the method further comprises a step of: calculating a voltage compensation value using the accurate excitation current value $i_{dtarget}$ and the accurate torque current value $i_{qtarget}$ so as to perform a compensation calculation for the target modulation ratio:

$$\begin{cases} U_d = R_s i_{dtarget} + L_d \frac{di_{dtarget}}{dt} - \omega_r L_q i_{qtarget} \\ U_q = R_s i_{qtarget} + L_q \frac{di_{qtarget}}{dt} + \omega_r(L_d i_{dtarget} + \psi_j) \end{cases} \quad 5)$$

wherein $R_s$ a rotor resistance, $\omega_r$ is an angular velocity, $U_d$ is a control voltage component of a shaft d, and $U_q$ is a control voltage component of a shaft q.

Preferably, a method for generating the target modulation ratio M is:

$$U_s = \sqrt{U_d^2 + U_q^2} \quad 6$$

$$M = \frac{\sqrt{3} * (U_s + PID.I_{dout})}{Fc} \quad 7)$$

wherein Fc is the input capacitor voltage, and $PID.I_{dout}$ is an excitation current regulation value;

a method for generating the modulation frequency Fs_out is as follows:

$$Fs\_out = (1 + PID.I_{qout}) * Fs \quad 8$$

wherein $PID.I_{qout}$ is a torque current regulation value, and Fs is a rotor frequency.

Compared with the prior art, the present application has the advantages and positive effects as follows:

1) In the control method for the permanent magnet synchronous traction and transmission system provided by the present application, through further researches on output characteristics and counter electromotive force of the permanent magnet synchronous motor, a novel SVPWM pulse control method is adopted to further decrease switching frequency, reduce switching loss of the converter, improve the system efficiency and realize a stable operation of the system at a low switching frequency.

2) In the present application, a new flux-weakening control algorithm is proposed for the control algorithm. By fitting the output voltage and comparing it with the input voltage, the system can operate stably in the flux-weakening region while the flux-weakening efficiency can be improved.

3) The present application proposes an accurate current calculation method, which can improve the control accuracy of the flux-weakening through a cooperation between the accurate current calculation unit and the flux-weakening compensation unit, and improve the system performance without changing the inverter capacity.

In which,

1—sampling unit; 101—current sensor; 102—voltage sensor; 103—resolver; 2—controller; 21—instruction acquisition unit; 22—MTPA calculation unit; 23—regulation unit; 231—excitation regulation unit; 232—torque regulation unit; 24—decoupling control unit; 25—segment synchronous modulation unit; 26—current accurate calculation unit; 27—flux-weakening compensation unit; 28—voltage feedforward unit; 3—permanent magnet synchronous motor; 4—traction converter; 41—IGBT converter module; 42—chopper module; 43—precharge module; 5—three-phase controllable contactor.

DETAILED DESCRIPTION OF THE PRESENT INVENTION

Hereinafter, specific embodiments of the present application will be further described with reference to the drawings.

A control system for a permanent magnet synchronous traction and transmission system provided by the present application can be applied into a train traction system powered by a permanent magnet synchronous motor, i.e., applied into a permanent magnet synchronous traction and transmission system (hereinafter referred to as a traction and transmission system).

Figure 1:
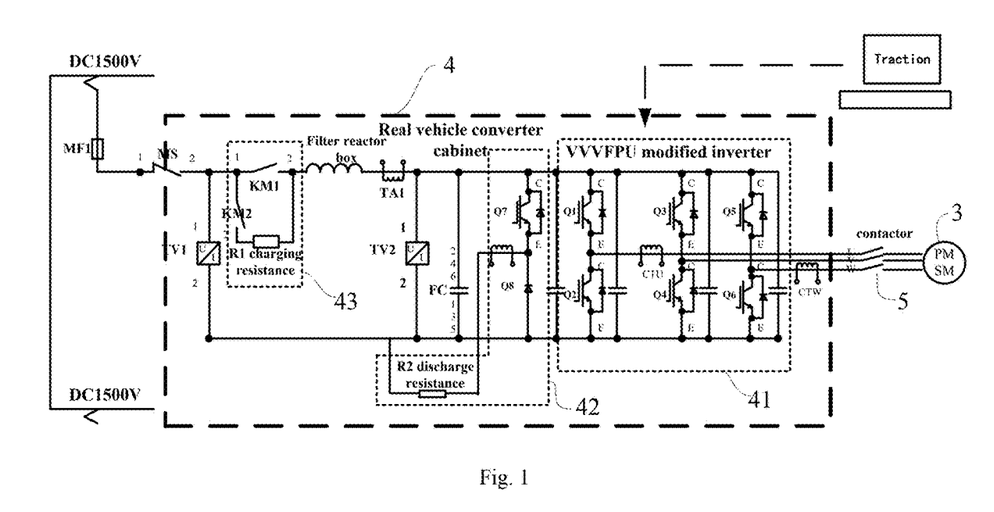
FIG. 1 is a schematic structural diagram of a permanent magnet synchronous traction and transmission system.

A main topology of the permanent magnet synchronous traction and transmission system is illustrated in FIG. 1, comprising a traction converter 4 and a Permanent Magnet Synchronous Motor 3 (PMSM), wherein an internal circuit of the traction converter 4 comprises an IGBT converter module 41, a chopper module 42 and a precharge module 43; and an output end of the traction converter 4 is connected to the permanent magnet synchronous motor 3 via a three-phase controllable contactor 5.

Figure 2:
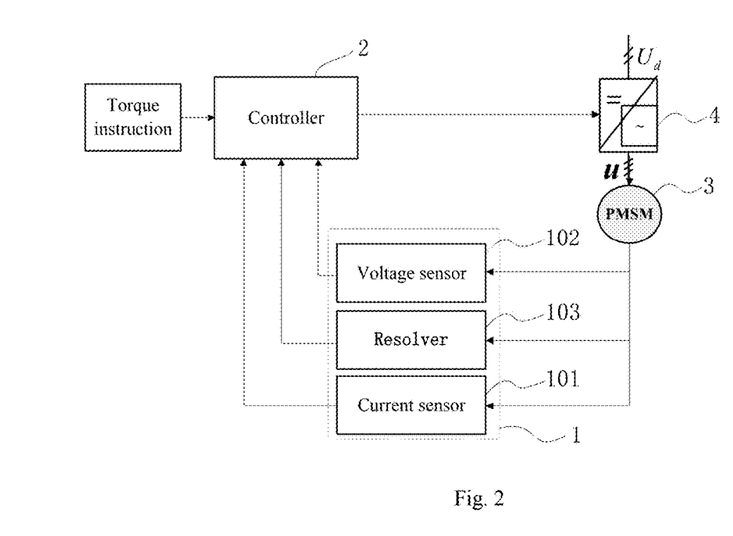
FIG. 2 is a simplified structural diagram of a control system in the present application.

The control system comprises a sampling unit 1 and a controller 2. FIG. 2 is a simplified structural diagram of the control system. In FIG. 2, the traction converter 4 is simplified as a symbol. By controlling a switching pulse of the IGBT converter module 41 in the traction converter 4, the permanent magnet synchronous traction and transmission system is controlled by the control system.

As illustrated in FIG. 2, the sampling unit 1 is connected to the permanent magnet synchronous motor 3, and comprises: a current sensor 101 for collecting operation excitation current $i_{d\_fed}$ and operation torque current $i_{q\_fed}$ of the permanent magnet synchronous motor 3, a voltage sensor 102 for collecting a input capacitor voltage Fc of the permanent magnet synchronous motor 3, and a resolver 103 for collecting an initial rotor position Theta and a rotor frequency Fs of the permanent magnet synchronous motor 3, wherein the above data collected by the sampling unit will be transmitted to the controller 2.

The current sensor 101, the voltage sensor 102 and the resolver 103 are all connected to the controller 2.

Figure 3:
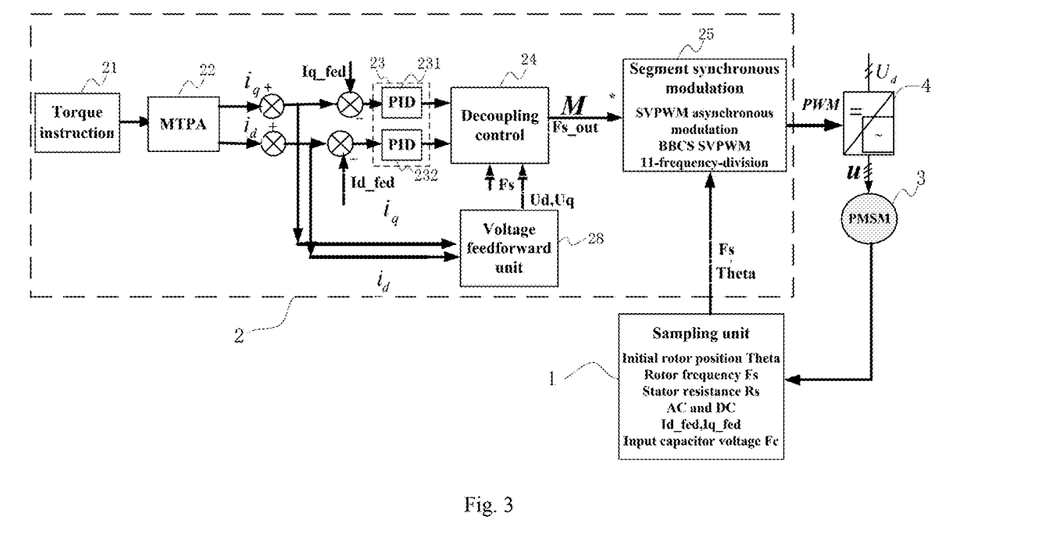
FIG. 3 is a schematic structural diagram of a control system according to an embodiment of the present application.
Figure 4:
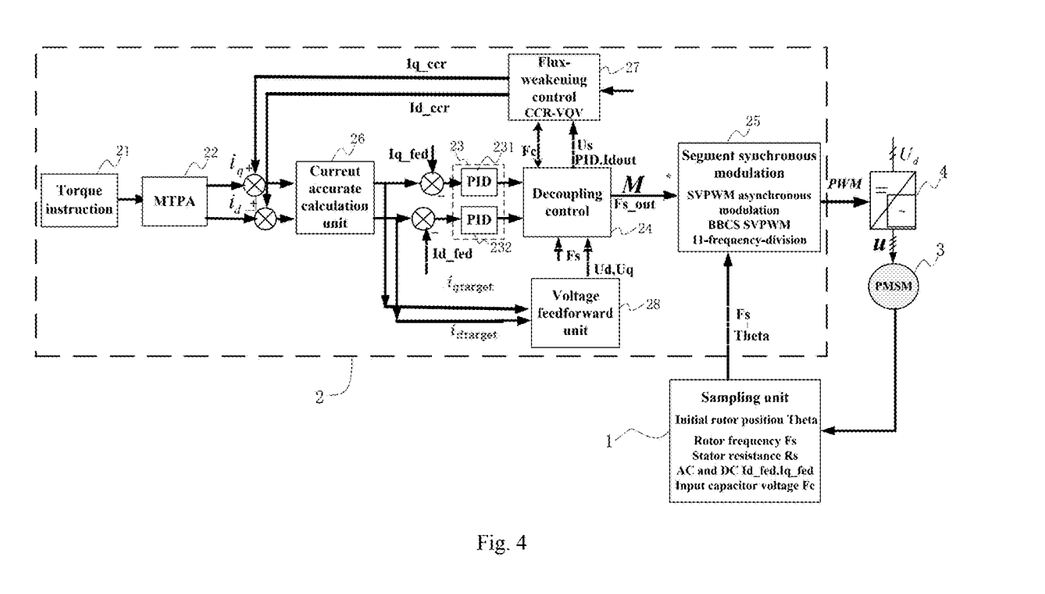
FIG. 4 is a schematic structural diagram of a control system according to another embodiment of the present application.

The data collected by the sampling unit 1 may be stored therein, and when any other unit needs to make a calculation, corresponding data will be extracted from the sampling unit 1. It should be noted that for convenience of illustration, only a data reading process between the sampling unit 1 and one of the units is illustrated in FIGS. 3 and 4. However, it can be understood that when any other unit needs to make a calculation, corresponding data may also be extracted from the sampling unit 1.

FIG. 3 is a schematic structural diagram of the control system, and it illustrates a structural composition of the controller 2. The controller 2 comprises:

an instruction acquisition unit 21 configured to acquire a target torque instruction issued to the traction and transmission system; the target torque instruction is an operation instruction for the whole traction and transmission system, and a control goal of the control system is to enable the traction and transmission system to operate stably according to the target torque instruction;

a Maximum Torque Per Ampere (MTPA) calculation unit 22 configured to calculate a target excitation current value $i_d$ and a target torque current value $i_q$ according to the target torque instruction; the MTPA calculation unit converts the target torque instruction into current signals $i_d$ and $i_q$ that can be used by the control system, and the control system performs a control according to target currents ($i_d$, $i_q$) and feedback currents ($i_{d\_fed}$, $i_{q\_fed}$) collected by the sampling unit;

a regulation unit 23, comprising: an excitation regulation unit 231 and a torque regulation unit 232, the excitation regulation unit 231 configured to generate an excitation current regulation value according to the target excitation current value $i_d$ and an operation excitation current value $i_{d\_fed}$, and the torque regulation unit 232 configured to generate a torque current regulation value according to the target torque current value $i_q$ and an operation torque current value $i_{q\_fed}$;

a decoupling control unit 24 configured to generate a target modulation ratio M and a modulation frequency Fs_out according to the excitation current regulation value and the torque current regulation value output from the regulation unit 23; and a segment synchronous modulation unit 25 configured to output a Pulse Width Modulation (PWM) modulation wave control signal for the permanent magnet synchronous motor 3, according to the target modulation ratio M and the modulation frequency Fs_out generated by the decoupling control unit 24.

Based on the above structure, the control system can complete a tracking control of the permanent magnet synchronous motor 3 according to the torque instruction.

As a further optimization of the structure of the control system, referring to FIG. 4, the controller 2 further comprises an current accurate calculation unit 26 configured to convert the target excitation current value $i_d$ and the target torque current value $i_q$ calculated by the MTPA calculation unit 22 into an accurate excitation current value and an accurate torque current value, and the current is calibrated through accurate current calculation, so that a control accuracy can be further improved. At this time, the excitation regulation unit 231 generates the excitation current regulation value by regulation according to the accurate excitation current value, and the torque regulation unit 232 generates the torque current regulation value by regulation according to the accurate torque current value.

As a further optimization of the control system, referring to FIG. 4, the controller 2 further comprises a flux-weakening compensation unit 27 configured to generate compensation signals for the target excitation current value $i_d$ and the target torque current value $i_q$ to compensate for both. The flux-weakening compensation unit 27 receives a signal output from the decoupling control unit 24 and a signal of the input capacitor voltage Fc, and generates current compensation values which are transmitted to an output end of the MTPA calculation unit 22. The current accurate calculation unit 26 performs an accurate current calculation according to a combination of output values of the MTPA calculation unit 22 and the compensation values fed back by the flux-weakening compensation unit 27.

It can be understood that the current accurate calculation unit 26 and the flux-weakening compensation unit 27 cooperate with each other to realize the accurate current calculation. That is, the flux-weakening compensation unit 27 receives signals output from the decoupling control unit 24 and the input capacitor voltage Fc collected by the sampling unit 1, and generates the compensation values for the target excitation current value $i_d$ and the target torque current value $i_q$, respectively. Further, the compensation values are transmitted to the current accurate calculation unit 26, which performs the accurate current calculation according to $i_d$ and $i_q$ output from the MTPA calculation unit 22 and the compensation values output from the flux-weakening compensation unit 27.

As a further optimization of the control system, the controller further comprises a voltage feedforward unit 28 configured to acquire output data of the current accurate calculation unit 26 and generates a compensation data for target torque. The compensation data will be fed back to the decoupling control unit 24 for calculating the modulation ratio.

The present application further provides a control method for the permanent magnet synchronous traction and transmission system, and the control method is classified into the following two embodiments according to the fact whether the accurate current calculation is performed.

Embodiment 1

A control method for the permanent magnet synchronous traction and transmission system provided by this embodiment comprises the following steps:

1) Converting a control target parameter

A target torque instruction of the traction and transmission system is converted into a target excitation current value $i_d$ and a target torque current value $i_q$.

An instruction acquired by the traction and transmission system is the target torque instruction, which is converted into the target excitation current value $i_d$ and the target torque current value $i_q$ of the permanent magnet synchronous motor 3 by the MTPA calculation unit 22. A specific conversion method is:

according to:

$$T_e = \frac{3}{2}P_n \vec{\psi}_f \times \vec{i_s} = \qquad 1)$$

$$\frac{3}{2}P_n\left[\psi_f i_s \sin\phi + \frac{1}{2}(L_q - L_d)i_s^2 \sin 2\phi\right] = \frac{3}{2}P_n\left[\psi_f i_q + \frac{1}{2}(L_q - L_d)i_d i_q\right]$$

$$i_d = \frac{\psi_f}{2(L_q - L_d)} \pm \sqrt{\frac{\psi_f^2}{4(L_q - L_d)^2} + i_q^2} \qquad 2)$$

the above two equations are combined to calculate the target excitation current value $i_d$ and the target torque current value $i_q$;

wherein $T_e$ is a target torque, $L_q$ is an equivalent inductance of a shaft q, $L_d$ is an equivalent inductance of a shaft d, $i_d$ is the target excitation current value, $i_q$ is the target torque current value, $i_s$ is a target phase current, $\psi_f$ is a motor flux linkage, $P_n$ is a number of pole pairs of the motor, and $\phi$ is a voltage-current angle difference of the motor.

2) Regulating and calculating the target excitation current value and the target torque current value The target excitation current value $i_d$ and the target torque current value $i_q$ calculated by the MTPA calculation unit 22 are transmitted to the regulation unit 23 for current regulation and calculation. An excitation current regulation value $PID.I_{dout}$ is generated by the excitation regulation unit 231 according to the target excitation current value $i_d$ and an operation excitation current value $i_{d\_fed}$; A torque current regulation value $PID.I_{qout}$ is generated by the torque regulation unit according to the target torque current value $i_q$ and an operation torque current value $i_{q\_fed}$. The excitation current regulation value and the torque current regulation value will be used for decoupling control to generate a target modulation ratio and a modulation frequency.

In this embodiment, a Proportion Integration Differentiation (PID) regulating and calculating method is adopted by the regulation unit 23, which is a well-known calculating method, and will not be described in detail here.

3) Decoupling the target excitation current value and the target torque current value, generating the target modulation ratio according to the target excitation current value, and generating the modulation frequency according to the target torque current value.

3.1) Calculating a voltage compensation value

The target excitation current value $i_d$ and the target torque current value $i_q$ are transmitted to the voltage feedforward unit 28 to calculate the voltage compensation value, i.e., the compensation data for target torque as aforementioned. A specific calculation method is as follows:

$$\begin{cases} U_d = R_s i_d + L_d \dfrac{di_d}{dt} - \omega_r L_q i_q \\ U_q = R_s i_q + L_q \dfrac{di_q}{dt} - \omega_r(L_d i_d + \psi_j) \end{cases} \qquad 5\text{-}1)$$

wherein $R_s$ is a rotor resistance, $\omega_r$ is an angular velocity, $U_d$ is a control voltage component of a shaft d, and $U_q$ is a control voltage component of a shaft q.

3.2) Generating the target modulation ratio and the modulation frequency

Figure 6:
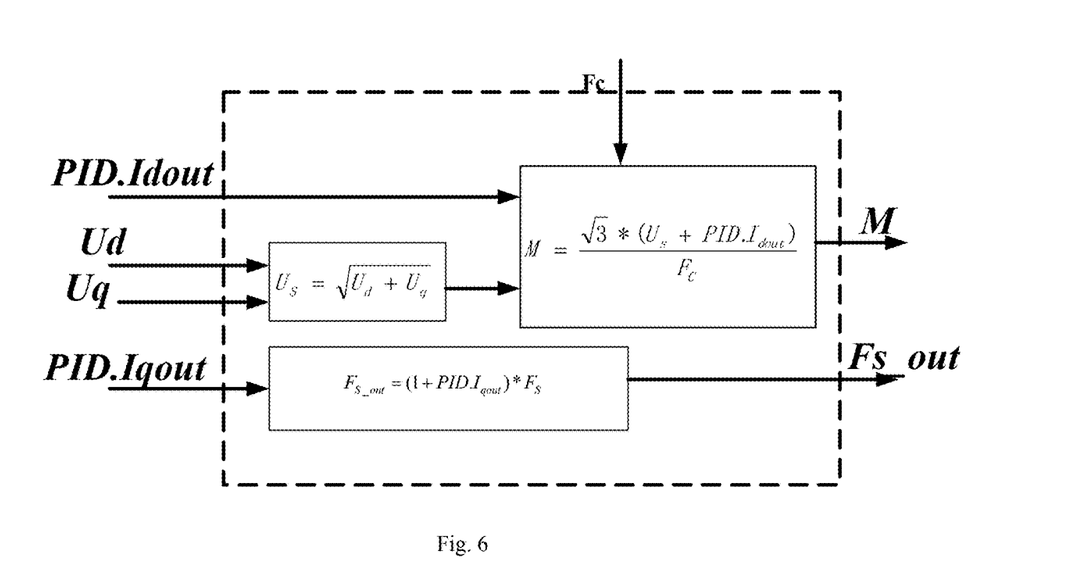
FIG. 6 is a principle diagram of a decoupling control in the present application.

Referring to FIG. 6, the $U_d$ and $U_q$ are output to the decoupling control unit 24 by the voltage feedforward unit 28, the excitation current regulation value $PID.I_{dout}$ and the torque current regulation value $PID.I_{qout}$ are generated and output to the decoupling control unit 24 by the regulation unit 23, and the target modulation ratio M and the modulation frequency Fs_out are generated by the decoupling control unit 24.

A method for generating the target modulation ratio M is as follows:

$$U_s = \sqrt{U_d + U_q} \qquad 6$$

$$M = \frac{\sqrt{3} * (U_s + PID.I_{dout})}{Fc} \qquad 7)$$

wherein Fc is a input capacitor voltage, and $PID.I_{dout}$ is the excitation current regulation value generated and outputted by the torque regulation unit 232.

A method for generating the modulation frequency Fs_out is as follows:

$$Fs\_out = (1 + PID.I_{qout}) * Fs \qquad 8$$

wherein PID.$I_{qout}$ is the torque current regulation value generated and outputted by the excitation regulation unit 231, and Fs is a rotor frequency collected by the sampling unit 1.

A synthesis of the target modulation ratio M and the modulation frequency Fs_out is finally completed by the decoupling control unit 24.

4) Segment synchronous modulating

According to the target modulation ratio M and the modulation frequency Fs_out, a PWM modulation wave is generated by the segment synchronous modulation unit for the control of the permanent magnet synchronous traction motor 3.

An asynchronous SVPWM modulation program receives the information of M and Fs_out, and generates a three-phase (u, v, w) pulse by determining a sector where a voltage vector is located.

Figure 7:
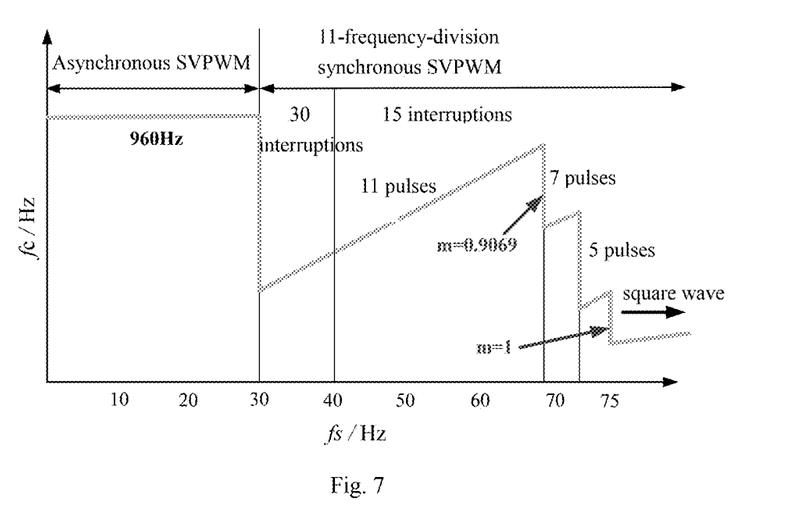
FIG. 7 is a principle diagram of an asynchronous SVPWM modulation.

Referring to FIG. 7, the target modulation ratio adopted in this embodiment is 0.906, and a modulation of a segment modulation module of the synchronous 11-frequency-division SVPWM modulation (Basic Boundary Clamping Strategy) is switched in such a way that when a modulation degree is greater than 0.906 and enters an overmodulation region, 4 of 11 pulses disappear symmetrically and 7 pulses remain; the modulation degree further increases, 2 pulses disappear symmetrically and 5 pulses remain; and when the modulation degree is greater than 1, only a square wave single pulse remains.

As illustrated in FIG. 7, within 30 Hz to 40 Hz is 11-frequency-division synchronous modulation I, and each modulation period has 30 interruptions; from above 40 Hz until the square wave is 11-frequency-division synchronous modulation II, and each modulation period has 15 interruptions; after entering the overmodulation region, the number of pulses decreases symmetrically with a increase of the modulation degree, and only a square wave single pulse remains when the modulation degree is greater than 1.

Figure 8:
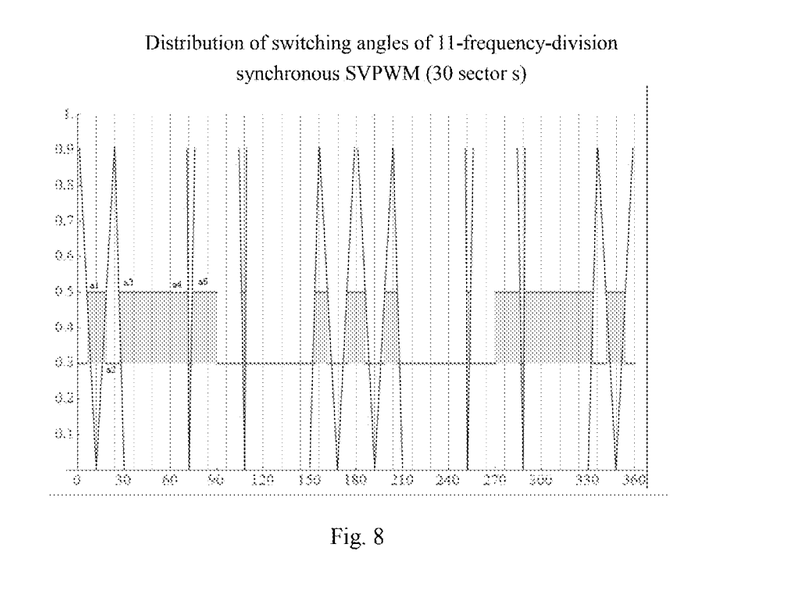
FIG. 8 is a distribution diagram of switching angles of 11-frequency-division synchronous SVPWM in the present application.

As illustrated in FIG. 8, by using an A-phase pulse of 11-frequency-division synchronous SVPWM with 30 interruptions, it is possible to derive five switching angles α1, α2, α3, α4, and α5 within ¼ period according to a comparison value corresponding to each sector.

According to characteristics of the synchronous SVPWM (½ period symmetry, ¼ period anti-symmetry), it is possible to derive a pulse width within the whole period, and then control On and OFF of the IGBT converter module. An angle calculation formula is as follows:

$$\begin{cases} \alpha_1 = 57.2958*(0.20944-020974*M)*pi/180.0 \\ \alpha_2 = (12.0+12.9427*M)*pi/180.0 \\ \alpha_3 = (24.0+28.6479*(0.20944-023094*M))*pi/180.0 \\ \alpha_4 = (60.0+57.2958*(0.20944-00241398*M))*pi/180.0 \\ \alpha_5 = (72.0+4.08888*M*pi/180.0 \end{cases}$$

Embodiment 2

A control method for the permanent magnet synchronous traction and transmission system provided by this embodiment comprises an accurate current calculation, and specifically comprises the following steps:

1) Converting of a control target parameter, which is the same as step 1) in Embodiment 1.

2) Performing an accurate current calculation

Further, a converted input capacitor voltage $F_{c1}$ is obtained according to a set target modulation ratio Mt; after a comparison with the input capacitor voltage Fc acquired by sampling, a torque current compensation amount $i_{q\_crr}$ and an excitation current compensation amount $i_{d\_crr}$ are generated by regulation, and respectively added with the target torque current value $i_q$ and the target excitation current value $i_d$ for synthesis, so as to perform the accurate current calculation.

Figure 5:
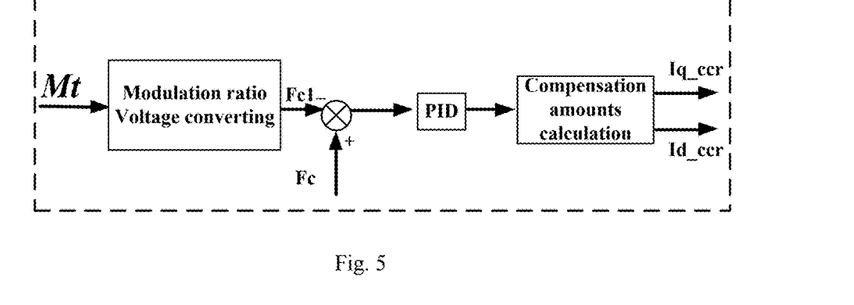
FIG. 5 is a principle diagram of a flux-weakening control in the present application.

A principle of the flux-weakening control of the flux-weakening compensation unit 27 is illustrated in FIG. 5. The flux-weakening compensation unit 27 uses an accurate voltage compensation amount, and takes the modulation ratio as a final control target to generate the compensation amounts of $i_d$ and $i_q$;

wherein Mt is the set target modulation ratio for the flux-weakening control (it can be construed as a modulation ratio expected by the system to be output to the segment synchronous modulation unit 25, and the flux-weakening compensation unit 27 is for the purpose that a final output of the decoupling control unit 24 is M=Mt), with a value range of 0 to 1, and an empirical value range of 0.88 to 0.91. A calculation formula of the feedback amount $F_{c1}$ is as follows:

$$F_{c1} = \frac{\sqrt{3}*(U_s + PID.I_{dout})}{M_t} \quad 9)$$

wherein $U_q$ and $U_d$ are output results of the voltage feedforward unit, and PID.Idout is a PID regulation output result of a shaft d, i.e., an output result of the torque modulation unit 232. $F_{c1}$ is calculated using the set target modulation ratio Mt.

A method for the accurate current calculation is:

performing an accurate calculation for the target excitation current value $i_d$ and the target torque current value $i_q$ to obtain an accurate excitation current value $i_{dtarget}$ and an accurate torque current value $i_{qtarget}$ of the motor:

$$i_{dtarget} = \frac{\psi_f + \sqrt{\psi_f^2 + 4\left(L_q - L_d - \frac{\partial L_q}{\partial L_d}\right)i_{qtarget}^2}}{2\left(L_q - L_d - \frac{\partial L_q}{\partial L_d}i_{qtarget}\right)} \quad 3)$$

$$i_{dtarget} = i_d + i_{d\_ccr} \quad 4$$

For the above process, it can be understood that the Us and PID.Idout is generated and output to the flux-weakening compensation control unit 27 by the decoupling control unit 24, and the converted input capacitor voltage $F_{c1}$ is obtained by the flux-weakening compensation control unit 27 according to the set target modulation ratio Mt; after a comparison with the input capacitor voltage Fc acquired by sampling, the torque current compensation amount $i_{q\_crr}$ and the excitation current compensation amount $i_{d\_crr}$ are generated by regulation, and outputted to the current accurate calculation unit 26 and added with the target torque current value $i_q$ and the target excitation current value $i_d$ calculated by the MTPA calculation unit 22 for synthesis, so as to perform the accurate current calculation.

In which, the regulating and calculating method of the torque current compensation amount $i_{q\_crr}$ and the excitation current compensation amount $i_{d\_crr}$ may be the PID regulating and calculating method, which will not be described in detail here.

3) Regulating and calculating the accurate excitation current value and the accurate torque current value.

The acquired accurate excitation current value $i_{dtarget}$ and the accurate torque current value $i_{qtarget}$ of the motor are used for the regulation and calculation. In this embodiment, the PID regulating method is adopted.

An excitation current regulation value $PID.I_{dout}$ is generated by the excitation regulation unit 231 according to the accurate excitation current value $i_{dtarget}$ and an operation excitation current value $i_{d\_fed}$; a torque current regulation value $PID.I_{qout}$ is generated by the torque regulation unit 232 according to the accurate torque current value $i_{qtarget}$ and an operation torque current value $i_{q\_fed}$; the excitation current regulation value $PID.I_{dout}$ and the torque current regulation value $PID.I_{qout}$ are used for the decoupling control to generate a target modulation ratio and a modulation frequency.

4) Generating the target modulation ratio and the modulation frequency.

Referring to FIG. 6, the target excitation current value and the target torque current value are decoupled, the target modulation ratio is generated according to the target excitation current value, and the modulation frequency is generated according to the target torque current value.

In order to further improve a calculation accuracy of the modulation ratio, in this embodiment, a voltage compensation value is calculated by using the accurate excitation current value $i_{dtarget}$ and the accurate torque current value $i_{qtarget}$, so as to perform a compensation calculating for the target modulation ratio:

$$\begin{cases} U_d = R_s i_{dtarget} + L_d \dfrac{di_{dtarget}}{dt} - \omega_r L_q i_{qtarget} \\ U_q = R_s i_{qtarget} + L_q \dfrac{di_{qtarget}}{dt} + \omega_r (L_d i_{dtarget} + \psi_j) \end{cases} \quad 5)$$

wherein $R_s$ is 5 is a rotor resistance, $\omega_r$ is an angular velocity, $U_d$ is a control voltage component of a shaft d, and $U_q$ is a control voltage component of a shaft q.

The method for generating the target modulation ratio and the modulation frequency is the same as the step 3.2) in Embodiment 1, and will not be repeated here.

5) Segment synchronous modulation, which is the same as step 4) in embodiment 1 and will not be repeated here.

It should be noted that the accurate current calculation is adopted by this embodiment. At an initial time, i.e., a start time, each data is substantially 0. After the start, an initial target excitation current value $i_d$ and an initial target torque current value $i_q$ are acquired by calculating the torque instruction. Since there is no operation data at this time and the accurate calculation cannot be performed, the target excitation current value $i_d$ and the target torque current value $i_q$ are decoupled by the regulation unit, and then a PWM signal is output to start the traction and transmission system; next, the sampling unit 1 collects corresponding operation data, and the entire control system starts to operate normally to achieve the accurate control.

The method described in the present application is used for the control of the permanent magnet traction and transmission system, which can reduce switching frequency, increase efficiency, and improve dynamic response speed and stability of the system.

Those described above are only preferred embodiments of the present application, rather than limitations to the present application in other forms. Any person skilled in the art can change or modify the technical content disclosed above into equivalent embodiments to be applied in other fields. However, any simple amendment, equivalent change or modification made to the above embodiments according to the technical essence of the present application without departing from the technical solutions of the present application still fall within the protection scope of the present application.

The invention claimed is:

1. A control system for a permanent magnet synchronous traction and transmission system, for controlling of the permanent magnet synchronous traction and transmission system, wherein the control system comprises a sampling unit and a controller;

the sampling unit is connected to a permanent magnet synchronous motor, and comprises: a current sensor for collecting an operation excitation current and an operation torque current of the permanent magnet synchronous motor, a voltage sensor for collecting a input capacitor voltage of the permanent magnet synchronous motor, and a resolver for collecting an initial rotor position and a rotor frequency of the permanent magnet synchronous motor;

the controller comprises:

an instruction acquisition unit, configured to acquire a target torque instruction issued to the traction and transmission system;

a Maximum Torque Per Ampere (MTPA) calculation unit, configured to calculate a target excitation current value and a target torque current value according to the target torque instruction;

a regulation unit, comprising: an excitation regulation unit and a torque regulation unit; the excitation regulation unit configured to generate an excitation current regulation value according to the target excitation current value and an operation excitation current value; and the torque regulation unit configured to generate a torque current regulation value according to the target torque current value and an operation torque current value;

a decoupling control unit, configured to generate a target modulation ratio and a modulation frequency according to the excitation current regulation value and the torque current regulation value output from the regulation unit;

a method for generating the target modulation ratio M is as follows:

$$U_s = \sqrt{U_d + U_q}$$

$$M = \frac{\sqrt{3} * (U_s + PID.I_{dout})}{Fc}$$

wherein Fc is the input capacitor voltage, and $PID.I_{dout}$ is an excitation current regulation value; $U_d$ is a control voltage component of a shaft d, and $U_q$ is a control voltage component of a shaft q;

a method for generating the modulation frequency Fs_out is as follows:

$$Fs\_out = (1 + PID.I_{qout}) * Fs$$

wherein PID.I$_{qout}$ is a torque current regulation value, and Fs is a rotor frequency;

a segment synchronous modulation unit, configured to output a Pulse Width Modulation (PWM) modulation wave control signal for the permanent magnet synchronous motor, according to the target modulation ratio and the modulation frequency generated by the decoupling control unit; and the segment synchronous modulation unit receives the information of M and Fs_out, and generates a three-phase (u, v, w) pulse by determining a sector where a voltage vector is located.

2. The control system according to claim 1, wherein the controller further comprises a flux-weakening compensation unit configured to generate compensation signals for the target excitation current value and the target torque current value to compensate for both.

3. The control system according to claim 2, wherein the controller further comprises an current accurate calculation unit configured to convert the target excitation current value and the target torque current value into an accurate excitation current value and an accurate torque current value; the excitation regulation unit generates the excitation current regulation value by regulation according to the accurate excitation current value, and the torque regulation unit generates the torque current regulation value by regulation according to the accurate torque current value.

4. The control system according to claim 3, wherein the controller further comprises a voltage feedforward unit configured to acquire output data of the current accurate calculation unit and generates a compensation data for target torque.

5. A control method for a permanent magnet synchronous traction and transmission system, comprising following steps of:

converting a target torque instruction of the traction and transmission system into a target excitation current value and a target torque current value;

regulating and calculating the target excitation current value and the target torque current value;

decoupling the target excitation current value and the target torque current value, generating a target modulation ratio according to the target excitation current value, and generating a modulation frequency according to the target torque current value; and using the target modulation ratio and the modulation frequency to control a permanent magnet synchronous traction motor;

a method for converting the target torque instruction of the traction and transmission system into the target excitation current value and the target torque current value of the permanent magnet synchronous motor is as follows:

according to:

$$T_e = \frac{3}{2}P_n \vec{\psi}_f \times \vec{i}_s = \quad 1)$$

$$\frac{3}{2}P_n\left[\psi_f i_s \sin\phi + \frac{1}{2}(L_q - L_d)i_s^2 \sin 2\phi\right] = \frac{3}{2}P_n\left[\psi_f i_q + \frac{1}{2}(L_q - L_d)i_d i_q\right]$$

$$i_d = \frac{\psi_f}{2(L_q - L_d)} \pm \sqrt{\frac{\psi_f^2}{4(L_q - L_d)^2} + i_q^2} \quad 2)$$

the above two equations are combined to calculate the target excitation current value and the target torque current value;

wherein $T_e$ is a target torque, $L_q$ is an equivalent inductance of a shaft q, $L_d$ is an equivalent inductance of a shaft d, $i_d$ is the target excitation current value, $i_q$ is the target torque current value, $i_s$ is a target phase current, $\psi_f$ is a motor flux linkage, $P_n$ is a number of pole pairs of the motor, and $\phi$ is a voltage-current angle difference of the motor.

6. The control method according to claim 5, wherein further comprises a step of: converting a converted input capacitor voltage according to a set target modulation ratio; after a comparison with a input capacitor voltage acquired by sampling, generating a torque current compensation amount $i_{q\_crr}$ and an excitation current compensation amount $i_{d\_crr}$ by regulation, and synthesizing the torque current compensation amount and the excitation current compensation amount with the target torque current value and the target excitation current value, respectively, for a subsequent calculation.

7. The control method according to claim 6, wherein further comprises a step of: performing an accurate calculation for the target excitation current value and the target torque current value to obtain an accurate excitation current value $i_{dtarget}$ and an accurate torque current value $i_{qtarget}$ of the motor:

$$i_{dtarget} = \frac{\psi_f + \sqrt{\psi_f^2 + 4\left(L_q - L_d - \frac{\partial L_q}{\partial L_d}\right)i_{qtarget}^2}}{2\left(L_q - L_d - \frac{\partial L_q}{\partial L_d}i_{qtarget}\right)} \quad 3)$$

$$i_{dtarget} = i_d + i_{d\_ccr} \quad 4$$

using the obtained accurate excitation current value $i_{dtarget}$ and accurate torque current value $i_{qtarget}$ for the regulating and calculating.

8. The control method according to claim 6, wherein further comprises a step of: calculating a voltage compensation value using the accurate excitation current value $i_{dtarget}$ and the accurate torque current value $i_{qtarget}$, so as to perform a compensation calculating for the target modulation ratio:

$$\begin{cases} U_d = R_s i_{dtarget} + L_d \frac{di_{dtarget}}{dt} - \omega_r L_q i_{qtarget} \\ U_q = R_s i_{qtarget} + L_q \frac{di_{qtarget}}{dt} - \omega_r (L_d i_{dtarget} + \psi_f) \end{cases} \quad 5)$$

wherein $R_s$ is a rotor resistance, is an angular velocity, $U_d$ is a control voltage component of a shaft d, and $U_q$ is a control voltage component of a shaft q, $\psi_f$ is a motor flux linkage.

9. The control method according to claim 8, wherein a method for generating the target modulation ratio M is as follows:

$$U_s = \sqrt{U_d + U_q} \quad 6$$

$$M = \frac{\sqrt{3} * (U_s + PID.I_{dout})}{Fc} \quad 7)$$

wherein Fc is the input capacitor voltage, and PID.I$_{dout}$ is an excitation current regulation value;

a method for generating the modulation frequency Fs_out is as follows:

$$Fs\_out = (1 + PID.I_{qout}) * Fs \qquad 8$$

wherein PID.I$_{quot}$ is a torque current regulation value, and Fs is a rotor frequency.

* * * * *